(12) United States Patent
Tissot (10) Patent No.: US 9,690,412 B2
(45) Date of Patent: Jun. 27, 2017

(54) TOUCH INTERFACE MODULE

(75) Inventor: Jean-Marc Tissot, Viuz en Sallaz (FR)

(73) Assignee: DAV, Créteil (FR)

(*) Notice: Subject to any disclaimer, the term of this patent is extended or adjusted under 35 U.S.C. 154(b) by 312 days.

(21) Appl. No.: 14/236,743

(22) PCT Filed: Jul. 27, 2012

(86) PCT No.: PCT/FR2012/000315
§ 371 (c)(1),
(2), (4) Date: Apr. 10, 2014

(87) PCT Pub. No.: WO2013/017747
PCT Pub. Date: Feb. 7, 2013

(65) Prior Publication Data
US 2014/0218324 A1    Aug. 7, 2014

(30) Foreign Application Priority Data

Aug. 3, 2011   (FR) ...................... 11 02436

(51) Int. Cl.
*G06F 3/041* (2006.01)
*B60K 37/06* (2006.01)
(Continued)

(52) U.S. Cl.
CPC .......... *G06F 3/0414* (2013.01); *B06B 1/0223* (2013.01); *B06B 1/045* (2013.01); *B06B 1/06* (2013.01); *B60K 37/06* (2013.01); *G06F 3/016* (2013.01); *G06F 3/03547* (2013.01); *B60K 2350/102* (2013.01)

(58) Field of Classification Search
CPC combination set(s) only.
See application file for complete search history.

(56) References Cited

U.S. PATENT DOCUMENTS

2007/0080951 A1*  4/2007  Maruyama ............ G06F 1/1626
                                                            345/173
2011/0141046 A1    6/2011  Sato et al.
2013/0207793 A1*  8/2013  Weaber ................ G06F 1/1601
                                                            340/407.2

FOREIGN PATENT DOCUMENTS

EP          1 544 720 A1       6/2005
KR    10-2010-0045543    *    5/2010
(Continued)

OTHER PUBLICATIONS

International Search Report for corresponding International Application No. PCT/FR2012/000315, mailed Jan. 21, 2013 (4 pages).

*Primary Examiner* — Van Chow
(74) *Attorney, Agent, or Firm* — Osha Liang LLP (57) ABSTRACT

The invention relates to an actuator (9) for a touch interface module (1) with haptic feedback, the interface module comprising a touch surface (3) able to detect at least one property of a user's touch, the actuator (9) comprising: a frame (11); a moveable core (13) interacting with the frame (11) and intended to be driven to move between extreme positions in order to generate the haptic feedback; and a main actuator connected to the touch surface (3) and able to generate haptic feedback depending on the detected touch and comprising electromagnetic actuating means (15, 17) for driving the moveable core (13) to move, characterized in that it furthermore comprises a controlled secondary actuator (18) cooperating with the moveable core (13).

15 Claims, 5 Drawing Sheets

(51) Int. Cl.
*G06F 3/01* (2006.01)
*G06F 3/0354* (2013.01)
*B06B 1/02* (2006.01)
*B06B 1/04* (2006.01)
*B06B 1/06* (2006.01)

(56) References Cited

FOREIGN PATENT DOCUMENTS

| KR | 10-2010-0045543 A | 5/2010 |
|---|---|---|
| WO | 2010/085575 A1 | 7/2010 |

\* cited by examiner

TOUCH INTERFACE MODULE

The present invention relates to a touch-sensitive interface module for a motor vehicle, notably allowing haptic feedback to be transmitted to a user, such as vibrational feedback.

In the automotive field, multifunction control modules, produced for example in the form of a joystick or rotary knob, are being increasingly used to control electrical or electronic systems such as an air conditioning system, an audio system or even a navigation system.

Such modules may be associated with a display screen and allow navigation through scrolling menus containing various commands relating to the systems that are to be controlled.

However, the presence of increasing numbers of increasingly complex functions means an increase in the number of such modules. Also, in order to increase the number of functions incorporated and improve the ergonomics of the man-machine interfaces, the use of an interface module with a touch-sensitive surface, at a control surface or even a touch-sensitive screen, is considered to be an advantageous development.

When a user applies pressure to the touch-sensitive surface of such a sensor, the pressure or force applied can be measured and/or the location of the spot at which the pressure or the force is applied can be determined. When this is done, pressure by the user is, for example, associated with the selection of a command.

Furthermore, in order to indicate to the user that his command has been acknowledged, whether that be during normal driving situations or when stationary but also in degraded situations (when operating blind, with a high demand for brain power), it is important for the user to have haptic feedback so that he can remain focused on the road by reducing the amount of brain power required to check that his action on the touch-sensitive surface is being carried out.

To achieve that, control modules with haptic feedback comprising actuators, such as electromagnetic actuators, connected to the interface module to transmit a vibrational movement so that the user can sense a haptic feedback informing him that his command has indeed been acknowledged, are already known.

These electromagnetic actuators comprise a coil and one or more magnets able to effect translational movement relative to the coil. By powering the coil, the magnets are set in motion and this motion is transmitted to the touch-sensitive surface.

A second setup, referred to as "voice-coil", "acoustic coil" because it is associated with the technical principle of loudspeakers, is obtained with the reverse setup, with the coil able to move relative to one or more magnets which are relatively fixed.

However, when the mobile cores reach the end of their travel, they strike buffers or even the frame of the actuator. These repeated impacts, aside from producing undesirable noise, contribute to component wear. In this way they reduce the effectiveness of the haptic feedback and may ultimately make replacement of all or part of the actuator necessary.

To alleviate this defect, it is known practice to fit damping elements between the components that have to strike one another. However, precisely because of their damping function, these components absorb energy that could have been used for instigating movement. This absorption of energy therefore reduces the overall efficiency of the actuator.

The invention notably proposes to improve the haptic feel, while at the same time avoiding impacts between the mechanical components of the actuator.

To this end, one subject of the invention is an actuator for a touch-sensitive interface module with haptic feedback, the interface module comprising a touch-sensitive surface able to detect pressure by a user, the actuator comprising:
  a frame,
  a mobile core collaborating with the frame, intended to be driven in motion between extreme positions in order to generate the haptic feedback, and
  a main actuator connected to the touch-sensitive surface, able to generate haptic feedback according to the pressure detected and comprising electromagnetic actuation means for driving the mobile core in motion;
characterized in that it further comprises a controlled secondary actuator collaborating with the mobile core.

The actuator thus obtained makes it possible to obtain a wide range of haptic feedbacks.

Said actuator may further exhibit one or more of the following features, considered alone or in combination.

The secondary actuator comprises a piezoelectric oscillator.

The secondary actuator comprises electromagnetic actuation means.

It further comprises a control unit configured to control the main actuator and the secondary actuator in such a way as to modulate the haptic feedback generated by the primary actuator using the secondary actuator.

The control unit is configured to actuate the secondary actuator in phase with the primary actuator so that the amplitude of the movement of said secondary actuator is summed with that of the primary actuator.

The control unit is configured to actuate the secondary actuator in phase opposition with the primary actuator so that the amplitude of the movement of said secondary actuator is subtracted from that of the primary actuator.

The control unit is configured to actuate the primary actuator and secondary actuator asynchronously.

The secondary actuator is connected firstly to the frame and secondly to the mobile core.

The secondary actuator is connected firstly to the frame and secondly to the mobile core.

It comprises two secondary actuators which are connected firstly to the frame and secondly to the mobile core and are arranged one on each side of said mobile core along the axis of movement of the mobile core.

Another subject of the invention is a touch-sensitive interface module with haptic feedback, the interface module comprising a touch-sensitive surface able to detect pressure by a user and at least one actuator comprising:
  a frame,
  a mobile core collaborating with the frame, intended to be driven in motion between extreme positions in order to generate the haptic feedback, and
  a main actuator connected to the touch-sensitive surface, able to generate haptic feedback according to the pressure detected and comprising electromagnetic actuation means for driving the mobile core in motion,
  controlled secondary actuator collaborating with the mobile core.

The module may further exhibit one or more of the following features, considered alone or in combination.

The electromagnetic actuation means comprise a coil on a first support and magnets on a second support, one of the supports being secured to the frame, the other being secured to the mobile core, and it comprises at least one secondary actuator connected firstly to the first support and secondly to the second support.

It further comprises a casing at least partially containing elements of said interface module, and also at least one elastic link between the mobile core and the bottom of the casing.

It comprises a plurality of actuators controlled by a common control unit that is configured to actuate the actuators in predetermined patterns in order to generate a range of different haptic feedbacks.

Finally, another subject of the invention is a method for generating haptic feedback in a touch-sensitive interface module with haptic feedback comprising a touch-sensitive surface able to detect pressure by a user, and at least one main actuator connected to the touch-sensitive surface, able to generate haptic feedback according to at least one of the characteristics of the detected pressure and comprising:
- a frame,
- a mobile core collaborating with the frame, intended to be driven in motion between extreme positions in order to generate the haptic feedback, and
- electromagnetic actuation means for driving the motion of the mobile core,
- a controlled secondary actuator collaborating with the mobile core;
characterized in that it comprises the steps:
the main actuator is actuated,
the motion of the main actuator is modulated using the secondary actuator.

Further advantages and features will become apparent from reading the description of the following figures, which are given by way of nonlimiting example.

In all the figures the same references apply to the same elements.

Figure 1:
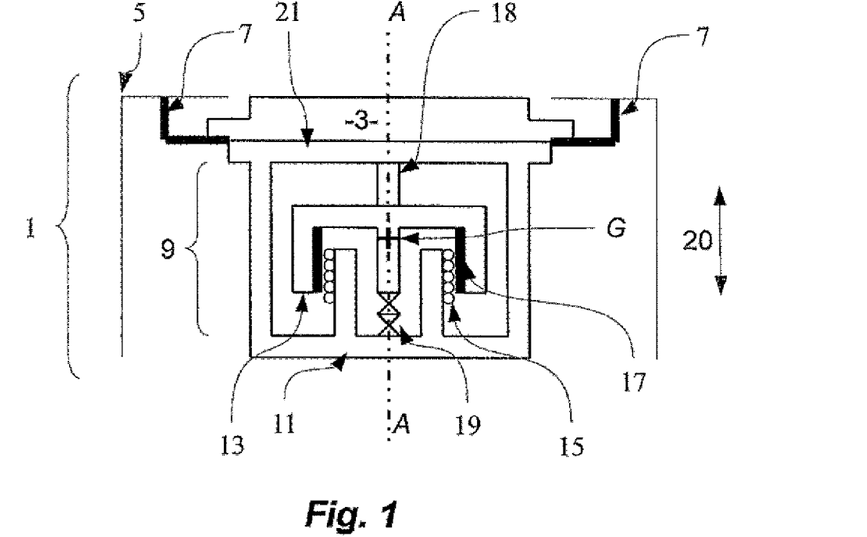
FIG. 1 is a schematic view in cross section of one embodiment of a touch-sensitive interface module according to the invention.

FIG. 1 depicts in schematic cross section a touch-sensitive interface module with haptic feedback 1, for example for a motor vehicle instrument panel, or alternatively for a motor vehicle central console, allowing control of the electrical or electronic systems of the vehicle, and capable of transmitting haptic feedback to a user who has, for example, modified or selected a command so as to assure the user that the command modified or selected has been acknowledged.

The interface module comprises a touch-sensitive surface 3, for example using capacitive technology, or pressure sensitive resistors (force sensing resistor FSR technology), to detect the location of the finger of a user on a position of its surface corresponding to a command. It is also possible to use a transparent touch-sensitive tile superposed on a display screen and operating for example by detecting surface waves.

In FIG. 1, the touch-sensitive surface is connected in a floating manner to the structure 5 of the touch-sensitive interface module 1. The connection between the surface 3 and the structure 5 is via a link 7 of the semirigid membrane type, or any other means of attachment that allows limited movements, for example in vibration along the axis A-A perpendicular to the touch-sensitive surface 3.

The touch-sensitive surface 3 is connected to an actuator 9 which provides the haptic feedback when it detects pressure by the user. This actuator 9 comprises firstly a frame 11, secured to the touch-sensitive surface 3, and a mobile core 13 collaborating with the frame 11.

The mobile core 13, housed in the frame 11, is set in motion between extreme positions by electromagnetic actuation means 15, 17. During this reciprocating motion, the core alternates between phases of acceleration and of deceleration during which the mobile core 13 causes the touch-sensitive surface 3 to be set in motion, and therefore provides the haptic feedback. The electromagnetic actuation means 15, 17 therefore form part of a main actuator able to generate haptic feedback according to the pressure detected.

Furthermore, the actuator 9 comprises a controlled secondary actuator 18, and a preloaded elastic means 19, which are positioned one on each side of the mobile core 13. The mobile core 13 is sandwiched between this controlled secondary actuator 18 and the preloaded elastic means 19, which are respectively situated between the touch-sensitive surface 3 and the mobile core 13, and between said mobile core 13 and the frame 11.

The elastic means 19 assists the electromagnetic actuation means 15, 17 in that it stores some of the kinetic energy imparted to the mobile core during its deceleration phases in the form of elastic potential energy, which it then releases during the acceleration phases.

The preloaded elastic means 19 and the secondary actuator 18 may, when the coil is not powered, define a rest position of the mobile core 13. The layout of the elastic means 19 and of the secondary actuator 18 means that this rest position is a floating one: the mobile core 13 is not in contact with any other component of the actuator 9.

The secondary actuator 18 may comprise one or more piezoelectric oscillators, or even electromagnetic actuation means such as a coil and magnets of a size smaller than those used 15, 17. The secondary actuator 18 may also comprise elastic means for damping impacts.

The elastic means 19 may comprise one or more helical spring/s or one or more leafspring/s.

It is also possible to use an elastic material, such as an expanded polymer of the urethane type, an ionomer (ionically crosslinked polymer) or rubber.

One embodiment positions the elastic means 19 and the secondary actuator aligned with the axis A-A, which is parallel to the direction of motion of the mobile core 13, embodied by the arrow 20, and which passes through the center of gravity G of the mobile core 13. In this way, they do not generate any torque on the mobile core 13. This has the effect of preventing said mobile core 13 from turning, which turning could cause it to jam or even to strike other mechanical components.

In particular, according to an alternative form that has not been depicted, provision may be made for the elastic means 19 to be made up of several elastic elements, or for the secondary actuator 18 to be made up of several controlled elements, and for these to be evenly distributed about the axis A-A so that the sum of the torques that they apply to the mobile core is zero.

In order to create the electromagnetic actuation means 15, 17, the frame 11 bears a coil 15 which is able to provide a magnetic field and the mobile core 13 carries at least one magnet 17, preferably several, positioned near the coil 15 and free in translation along the axis A-A. A reverse setup, with the frame 11 bearing the magnets 17 and the mobile core 13 carrying the coil 15, is, however, also conceivable.

FIG. 1 shows one embodiment of an actuator that is referred to as "suspended". What is meant by suspended is that the actuator 9 is not connected to the structure 5 of the touch-sensitive interface module 1 and that the frame 11 is secured to the touch-sensitive surface 3.

In the suspended setup, it is the mobile core 13 which sets the touch-sensitive surface 3 in motion to generate the haptic feedback.

The frame 11 has a cover 21 serving as a support to which to attach the touch-sensitive surface 3. The frame 11 forms a receptacle accommodating the rest of the actuator 9. The secondary actuator 18 of the actuator 9 is connected to the cover 21 of the frame 11 on the one hand and to the yoke 13 on the other, and the elastic means 19 is connected to the frame 11 on the one hand and to the yoke 13 on the other.

The actuator 9 therefore forms a clearly defined functional entity that can easily be fitted to and removed from the interface module 1. Specifically, this functional entity is simply screwed or clipped to the touch-sensitive surface 3 and can therefore be interchanged quickly, without the need to handle the elastic means 19 or the secondary actuator 18. The actuator 9 may alternatively be bonded on for a less expensive means of attachment, if interchangeability is sacrificed.

Figure 2:
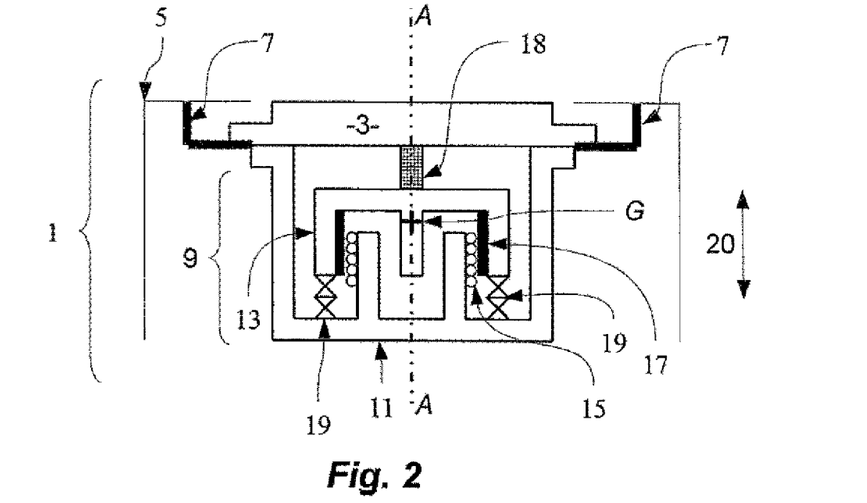
FIG. 2 is a schematic view in cross section of a second embodiment of an interface module according to the invention.

It is, however, conceivable to create an alternative form of this setup, which is shown in FIG. 2, where the frame 11, having no cover 21, is open at its top, and the secondary actuator 18 of the actuator 9 is connected directly to the touch-sensitive surface 3 on the one hand and to the mobile core 13 on the other, and the elastic means 19 is connected to the frame 11 on the one hand and to the mobile core 13 on the other. In FIG. 2, the elastic means 19 comprises two elements arranged symmetrically about the axis A-A, between the mobile core 13 and the frame 11 at supports of the electromagnetic actuation means, in this instance a support for the coil 15 secured to or an integral part of the frame, and a support for the magnets 17 secured to or an integral part of the mobile core 13.

Another embodiment that has not been depicted anticipates the use of additional secondary actuators 18 in place of the elastic means elements 19.

According to one embodiment, provision is made for the frame 11 and the mobile core 13 to comprise guide means 13, 33 which guide by collaboration of shapes. For that, the mobile core 13 has an E-shaped cross section the central branch of which is fitted into a corresponding U-section portion of the frame 11.

Control of the actuator 9 in concert with the electromagnetic actuation means 15, 17 and by the secondary actuator 18 makes it possible to vary the forms of oscillation of the mobile core 13. It is therefore possible to generate different haptic feedbacks which may be used to indicate the same number of varied pieces of information to the user: to acknowledge the selection, the movement, or, on the other hand, to reject them, or alternatively to detect an incorrect input.

Figure 3:
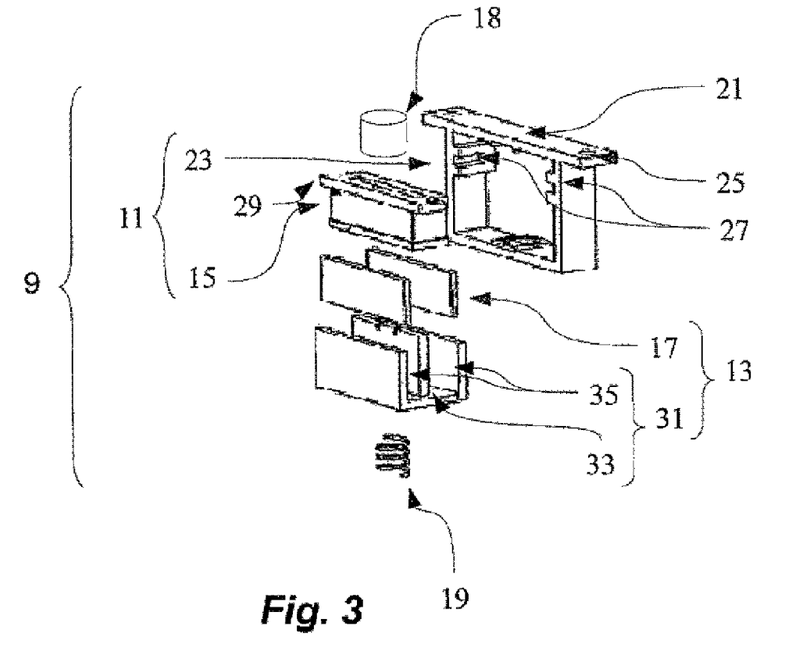
FIG. 3 is an exploded view of one embodiment of an actuator according to the invention.
Figure 4:
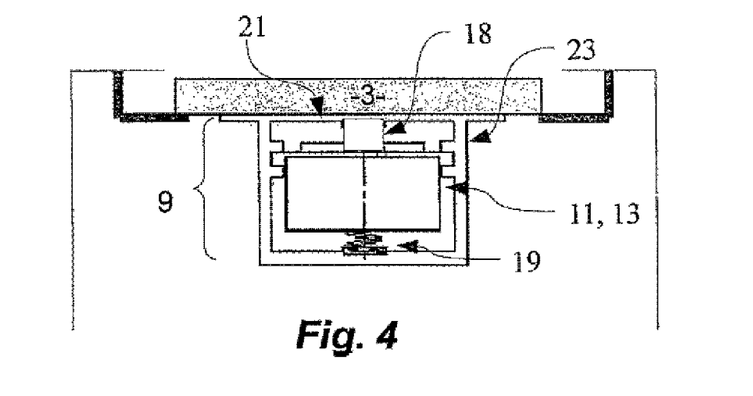
FIG. 4 is a side view of the actuator of FIG. 3 mounted in a touch-sensitive interface module.

FIGS. 3 and 4 depict another alternative form of embodiment of a suspended actuator 9.

The frame 11 is made up of two parts: a coil 15 and a fixed support 23. The fixed support 23 forms a surround and surrounds the coil 15. It also accommodates the other parts of the actuator 9. On its upper part forming a cover 21 it has two predrillings 25, which house retaining screws that fix it to the touch-sensitive surface 3. On its inside, it has two clip fastening sites 27 intended to engage with two complementary tabs 29 on the sides of the coil 15 so as to hold the latter in place, as seen in FIG. 4.

The mobile core 13 comprises two magnets 17 which are kept facing the sides of the coil 15, and a yoke 31 to which the magnets 17 are fixed by clipping, overmolding or bonding. The yoke 31 has a cross section in the shape of an E, the central branch 33 of which is fitted into the coil 15, extending beyond the coil 15 slightly at each end. The two lateral branches 35 carry the magnets 17.

At the time of assembly, the assembly comprising coil 15, mobile core 13, secondary actuator 18 and spring 19 is first of all assembled separately and then compressed to preload the springs 19A and 19B. It is lastly inserted into the fixed support 23 via one of the lateral openings of said fixed support.

The actuator 9 thus assembled is then screwed to the internal or back surface of the touch-sensitive surface 3, as seen in FIG. 4.

Figure 5:
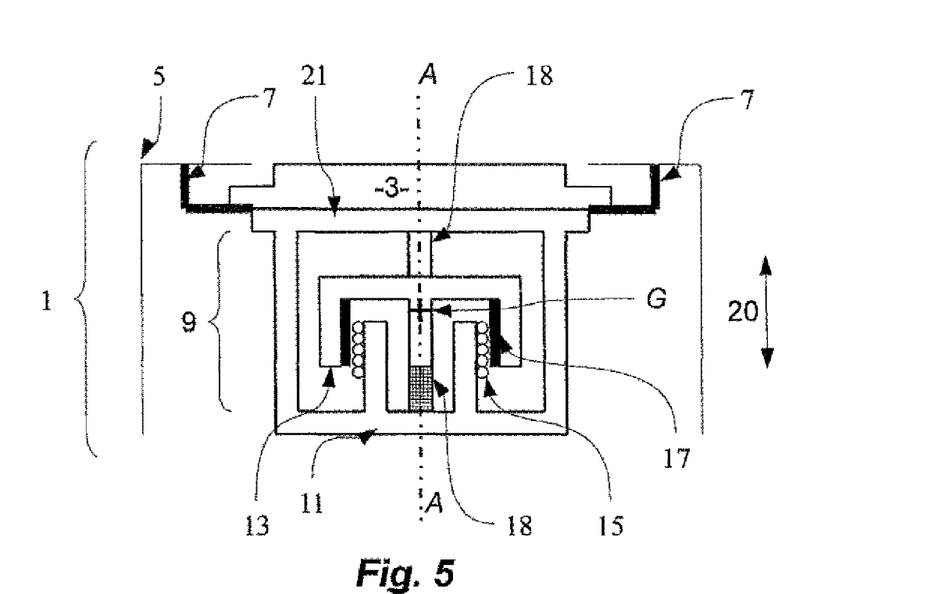
FIGS. 5 to 9 are schematic views in cross section of other embodiments of an actuator according to the invention.

FIG. 5 schematically shows an alternative embodiment of the interface module 1. In this embodiment, the actuator 9 comprises two secondary actuators 18, situated one on each side of the mobile core 13.

Figure 6:
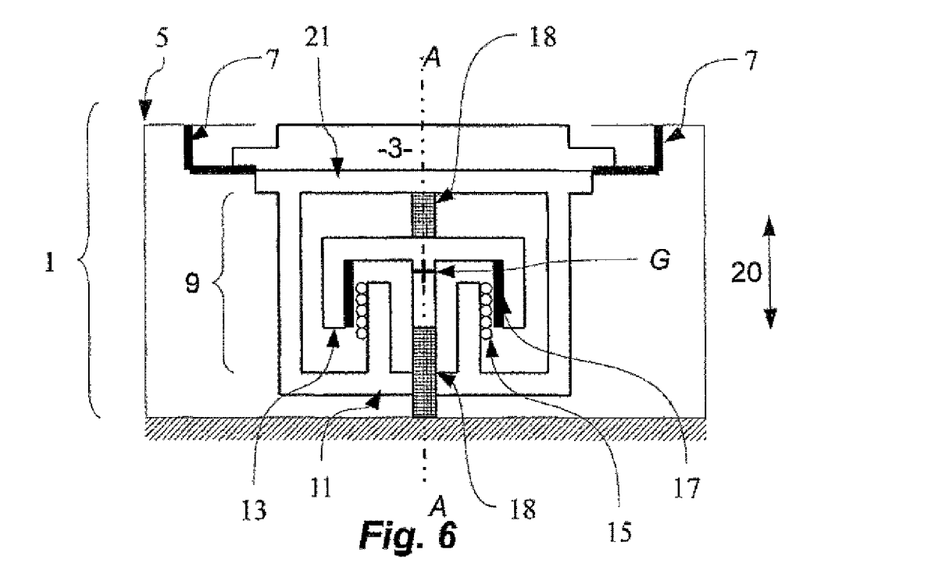

In FIG. 6, the structure 5 of the interface module 1 forms a casing at least in part containing the elements of said interface module. This casing has a bottom and the actuator 9 comprises an additional secondary actuator 18 positioned between the mobile core 13 and the bottom of the casing.

Figure 7:
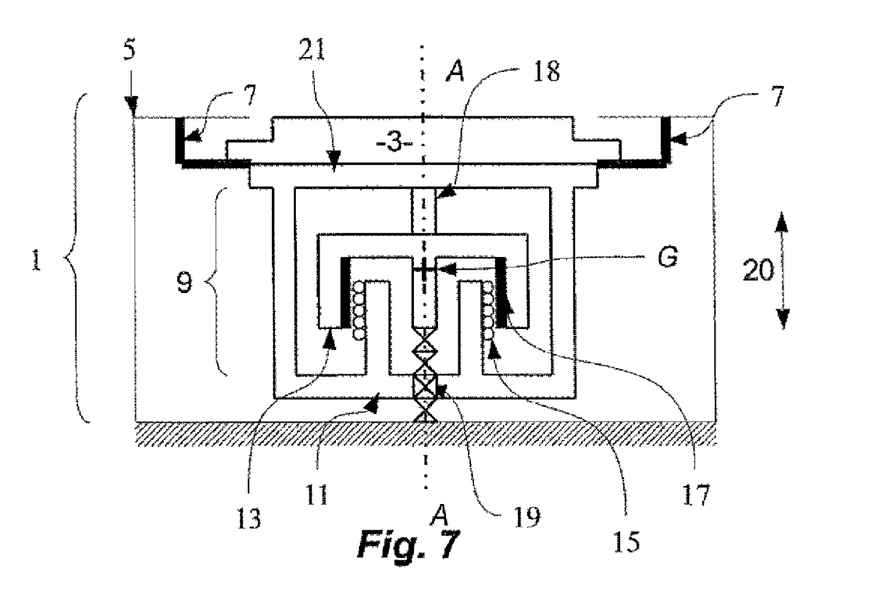

The embodiment depicted in FIG. 7 differs from that depicted in FIG. 6 through the presence of an elastic means 19 between the mobile core 13 and the bottom of the casing, in place of the additional secondary actuator 18.

Figure 8:
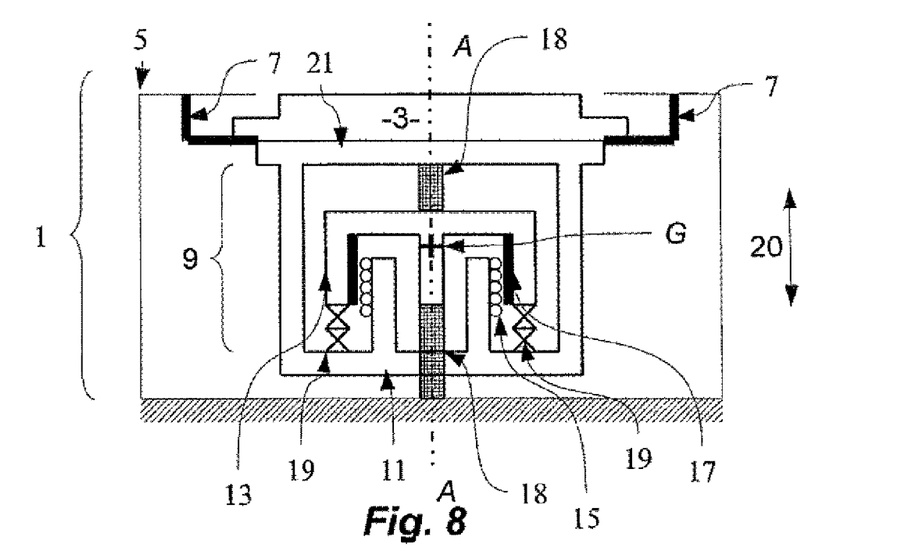

The embodiment depicted in FIG. 8 is similar to that of FIG. 7 and also comprises elastic means 19 connecting the mobile core 13 to the electromagnetic actuation means, in this instance the coil 15.

Figure 9:
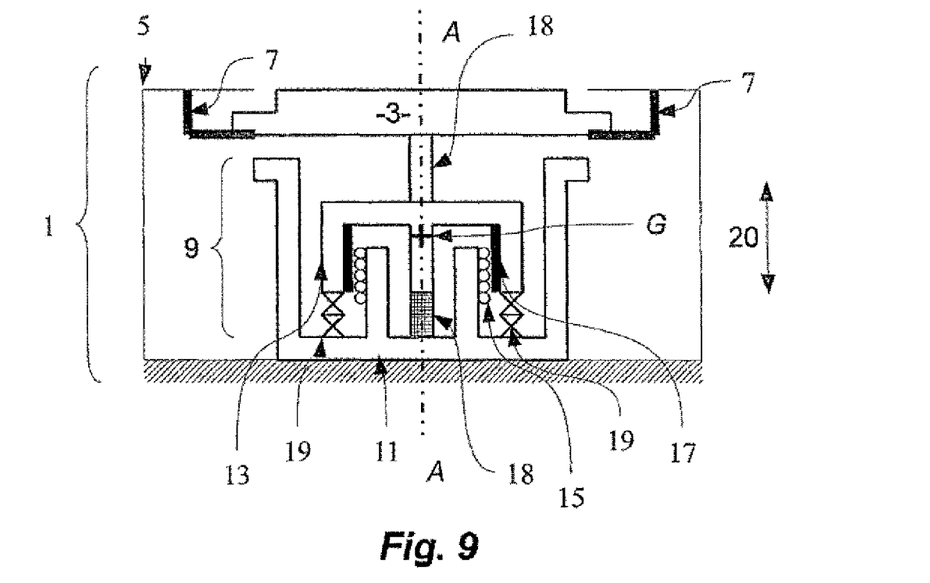

FIG. 9 shows an embodiment referred to as a "connected" embodiment. The term connected means that the frame 11 is secured to the bottom of the structure 5 rather than to the touch-sensitive surface 3, and the mobile core 13 is connected to the touch-sensitive surface 3, via a secondary actuator 18.

The frame 11 has no cover 21, to allow the passage of the connection to the touch-sensitive tile 3 that the secondary actuator 18 represents. Alternatively, said connection may be done by a rigid connection or an elastic means 19 and may potentially pass through an opening in the cover 21 if the cover is kept.

An additional embodiment that has not been depicted can be obtained by replacing the additional elastic means 19 of the embodiment of FIG. 8 with secondary actuators 18.

In all of the embodiments mentioned hereinabove, the secondary actuation means 18 is or are controlled by a control unit that potentially controls the actuation means 15, 17 of the main actuator and of the secondary actuators 18 in predetermined patterns in order to generate a range of different haptic feedbacks.

To do this, the control unit may trigger the secondary actuator or actuators 18 in phase with the main actuation means 15, 17 so that their amplitudes are summed; or on the contrary the control unit may trigger the secondary actuator or actuators 18 in phase opposition with the main actuation means 15, 17, so that their amplitudes subtract one from another.

Furthermore, the unit may trigger the secondary actuators 18 asynchronously in relation to the main actuation means 15, 17. In that way, a stepped tactile feedback with two or more amplitude levels is obtained. Further, the secondary actuators 18 can be used to sustain the vibration of the mobile core 13 that is initiated by the main actuation means 15, 17, with lower energy consumption.

The use of at least one secondary actuator 18 makes it possible to produce an extended range of haptic feedbacks. The secondary actuator or actuators 18 may further be implemented in a compact way in existing actuator 9 designs as a replacement for the elastic means 19.

The invention claimed is:

1. An actuator for a touch-sensitive interface module with haptic feedback, the interface module comprising a touch-sensitive surface able to detect at least one characteristic of pressure by a user, the actuator comprising:
 a frame;
 a mobile core collaborating with the frame, intended to be driven in motion between extreme positions in order to generate the haptic feedback;
 a main actuator connected to the touch-sensitive surface, able to easily be fitted to and removed from the interface module, and generate haptic feedback according to the pressure detected and comprising electromagnetic actuation means for driving the mobile core in motion; and
 a controlled secondary actuator collaborating with the mobile core.

2. The actuator as claimed in claim 1, wherein the secondary actuator comprises a piezoelectric oscillator.

3. The actuator as claimed in claim 1, wherein the secondary actuator comprises electromagnetic actuation means.

4. The actuator as claimed in claim 1, further comprising a control unit configured to control the main actuator and the secondary actuator in such a way as to modulate the haptic feedback generated by the primary actuator using the secondary actuator.

5. The actuator as claimed in claim 4, wherein the control unit is configured to actuate the secondary actuator in phase with the primary actuator so that the amplitude of the movement of said secondary actuator is summed with that of the primary actuator.

6. The actuator as claimed in claim 4, wherein the control unit is configured to actuate the secondary actuator in phase opposition with the primary actuator so that the amplitude of the movement of said secondary actuator is subtracted from that of the primary actuator.

7. The actuator as claimed in claim 4, wherein the control unit is configured to actuate the primary actuator and secondary actuator asynchronously.

8. The actuator as claimed in claim 1, wherein the secondary actuator is connected firstly to the frame and secondly to the mobile core.

9. The actuator as claimed in claim 1, wherein the secondary actuator is connected firstly to the frame and secondly to the touch-sensitive surface.

10. The actuator as claimed in claim 1, further comprising two secondary actuators which are connected firstly to the frame and secondly to the mobile core and are arranged one on each side of said mobile core along the axis of movement of the mobile core.

11. A touch-sensitive interface module with haptic feedback, the interface module comprising a touch-sensitive surface able to detect pressure by a user and at least one actuator comprising:
 a frame;
 a mobile core collaborating with the frame, intended to be driven in motion between extreme positions in order to generate the haptic feedback, and
 a main actuator connected to the touch-sensitive surface, able to easily be fitted to and removed from the interface module, and generate haptic feedback according to the pressure detected and comprising electromagnetic actuation means for driving the mobile core in motion,
 controlled secondary actuator collaborating with the mobile core.

12. The interface module as claimed in claim 11, the electromagnetic actuation means comprising a coil on a first support and magnets on a second support, one of the supports being secured to the frame, the other being secured to the mobile core, wherein the interface module further comprises at least one secondary actuator connected firstly to the first support and secondly to the second support.

13. The interface module as claimed in claim 11, further comprising a casing at least partially containing elements of said interface module, characterized in that it further comprises at least one elastic means between the mobile core and the bottom of the casing.

14. The interface module as claimed in claim 11, further comprising a plurality of secondary actuators controlled by a common control unit that is configured to actuate the primary actuator and secondary actuators in predetermined patterns in order to generate a range of different haptic feedbacks.

15. A method for generating haptic feedback in a touch-sensitive interface module with haptic feedback comprising a touch-sensitive surface able to detect pressure by a user, and at least one main actuator connected to the touch-sensitive surface, able to generate haptic feedback according to at least one characteristic of the detected pressure and comprising:
 a frame;
 a mobile core collaborating with the frame, intended to be driven in motion between extreme positions in order to generate the haptic feedback, and
 electromagnetic actuation means for driving the motion of the mobile core,
 a controlled secondary actuator collaborating with the mobile core;
 the main actuator, that is easily fitted to and removed from the interface module, is actuated,
 the motion of the main actuator is modulated using the secondary actuator.

* * * * *